United States Patent [19]

Pagluica

[11] Patent Number: 4,563,129
[45] Date of Patent: Jan. 7, 1986

[54] INTEGRATED REDUCTION GEAR AND COUNTERROTATION PROPELLER

[75] Inventor: Gino Pagluica, Manchester, Conn.

[73] Assignee: United Technologies Corporation, Hartford, Conn.

[21] Appl. No.: 559,599

[22] Filed: Dec. 8, 1983

[51] Int. Cl.⁴ ............................................. B64C 11/48
[52] U.S. Cl. .................... 416/129; 416/170 R
[58] Field of Search .............. 416/129, 128, 170 R; 415/68

[56] References Cited

U.S. PATENT DOCUMENTS

| | | | |
|---|---|---|---|
| 1,887,429 | 11/1932 | Price | 416/129 |
| 2,085,483 | 6/1937 | Trebucien . | |
| 2,186,064 | 1/1940 | Dekker . | |
| 2,192,469 | 3/1940 | Green . | |
| 2,322,394 | 6/1943 | Sharpe | 74/289 |
| 2,416,689 | 3/1947 | Grady . | |
| 2,480,806 | 8/1949 | Desmoulins . | |
| 2,494,368 | 1/1950 | Steele et al. | 244/1 |
| 2,522,443 | 9/1950 | Gaubatz et al. | 74/801 |
| 2,540,991 | 2/1951 | Price | 244/15 |
| 2,586,054 | 2/1952 | Jonas . | |
| 2,765,040 | 10/1956 | Darrah . | |
| 3,087,553 | 4/1963 | Kostyun . | |
| 3,153,907 | 10/1964 | Griffith | 60/39.15 |
| 3,450,208 | 6/1969 | Barton . | |
| 3,646,834 | 3/1972 | Davis | 74/674 |
| 3,669,564 | 6/1972 | Garfinkle | 416/121 |
| 3,729,957 | 5/1973 | Petrie et al. | 60/226 R |
| 3,811,791 | 5/1974 | Cotton | 416/129 |
| 3,853,432 | 12/1974 | Cronstedt | 417/405 |
| 3,933,324 | 1/1976 | Ostrowski | 416/129 X |
| 4,216,925 | 8/1980 | Mendiberri | 244/60 |
| 4,464,095 | 8/1984 | Iida | 416/170 R X |

FOREIGN PATENT DOCUMENTS 880103   6/1953   Fed. Rep. of Germany ...... 416/129

*Primary Examiner*—Everette A. Powell, Jr.
*Attorney, Agent, or Firm*—Charles A. Warren

[57] ABSTRACT

A combined counterrotation propeller and reduction gear in which the shaft for the forward propeller also carries the pinions of the reduction gear and the hollow shaft for the rearward propeller also carries the ring gear in mesh with the pinions. The bearings for the propeller shafts also support the elements of the reduction gear.

6 Claims, 1 Drawing Figure

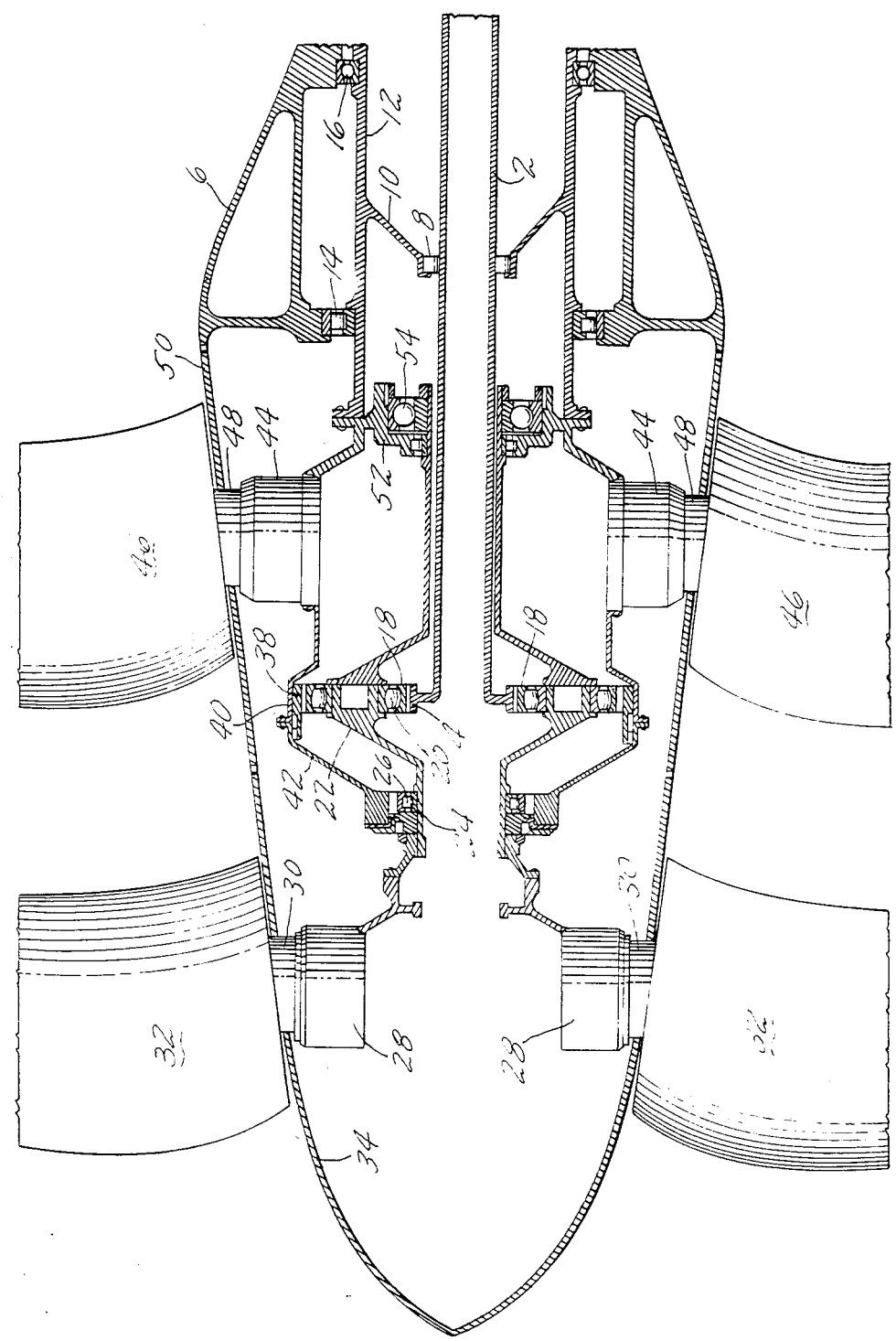

INTEGRATED REDUCTION GEAR AND COUNTERROTATION PROPELLER

DESCRIPTION

TECHNICAL FIELD

The reduction gear through which the counterrotation propeller is driven, is integrated with the propeller drive in a single mechanism utilizing common shafts and common bearings.

BACKGROUND ART

The counterrotation propeller usually has within its support structure the mechanism for producing the counterrotation of the individual row of propeller blades. This mechanism is connected through a separate reduction gear in its own case to the engine; the result is a relatively long structure such that the propellers are spaced significantly from the engine resulting in a long power structure. The overhang of the propellers increases the torque on the engine supports and necessitates a more rugged support structure throughout the assembly. This arrangement significantly increases the overall weight of the structure and results in an unwieldy arrangement with the spacing of the propeller farther from the support structure than would be desirable.

DISCLOSURE OF INVENTION

The reduction gear mechanism of the present invention is incorporated in the propeller reversing mechanism by integrating the drive shaft of the propeller and the gearing components of the reduction gear. This permits the use of the same bearings for both mechanisms thereby reducing the number of bearings in the assembly and eliminating the separate gearbox for reduction gearing. In this way the propeller structure is mounted closer to the engine and loading on the engine structure and its supports is significantly reduced.

According to the invention the drive shaft from the engine carries a sun gear which meshes with pinions carried by a cage and shaft device that connects directly to the forward propeller. These pinions in turn mesh with a ring gear on a surrounding hollow shaft on which the rearward propeller is mounted. This hollow shaft is journalled in the support structure and in turn supports the cage and shaft device. This hollow shaft also carries a bearing to support the drive shaft. With this arrangement the pinions and cage are located axially between the two propellers and no additional lengthwise dimension is necessary for the reduction gear.

The foregoing and other objects, features and advantages of the present invention will become more apparent from the following description of preferred embodiments and accompanying drawings.

BRIEF DESCRIPTION OF DRAWINGS

The single FIGURE is a sectional view longitudinally through the structure.

BEST MODE FOR CARRYING OUT THE INVENTION

The shaft 2 which connects directly to the engine drive shaft carries on its forward end a sun gear 4. This shaft is mounted within the support structure 6 for the propeller by a bearing 8 carried on a conical extension 10 on the inner surface of a sleeve 12 which in turn is supported by bearings 14 and 16 in the support structure. The bearing 8 is located axially between the bearings 14 and 16 to provide a secure support for the shaft 2 at this location.

The sun gear meshes with several surrounding pinions 18 each carried on bearings 20 in a cage 22 having a forwardly extending sleeve 24 journalled in a bearing 26 and supporting forwardly of the bearing the casings 28 to receive the hubs 30 for the individual propeller blades 32 of the forward propeller. The casings 28 are positioned within a nose cone 34 having openings for the hubs 30 of the propeller and the casings have the necessary support bearing and structure for controlling the pitch of the propeller blades. This structure is old and well known and not being a part of this invention will not be described in detail.

The pinions are in mesh with a ring gear 38 surrounding the pinions and carried on an annular member 40 having a portion 42 extending forwardly of the ring gear and carrying the bearing 26. Rearwardly of the ring gear, the member 40 carries casings 44 for supporting the individual propeller blades 46 for the rearward propeller. The hubs 48 of these propeller blades extend inwardly into the casings where they are supported by suitable bearings, not shown. A cowling sleeve 50 surrounds the ring of casings and forms a rearward extension of the nose cone. This sleeve is suitably supported from the member 40.

The rearward end of the member 40 has an integral support 52 for bearing 54 that support the rearward end of the sleeve 56 attached to and functionally integral with the cage 22. In this way the cage is supported by and inwardly of the member 40 by the bearings 26 and 54 the latter being a thrust bearing to take the axial loading of the forward propeller.

The rearward end of the member 40 is also attached to the front end of and functionally integral with the sleeve 12 so that the member 40 is supported from the support structure by the bearings 14 and 16 the latter being a thrust bearing to take the axial loading of the rearward propeller. In this way the bearings that support the propellers within the support structure also serves to support the elements of the reduction gear thereby reducing the number of bearings necessary for the integrated reduction gear and propeller drive mechanism. It will be understood that the structure 6 is a part of the aircraft structure on which the engine is also mounted and forms in general a cowling located forwardly of the engine and in alignment therewith.

It will be understood that the term propeller means a row of propeller blades surrounding a row of casings that support them. Thus the forward propeller by reference includes the several propeller blades which make up the row of blades. It will be apparent that there is a division of the power input between the pinions and the cage to the forward propeller and the ring gear and supporting structure to the rearward propeller. In this way the rotation of the forward propeller will be opposite to that of the rearward propeller and an equal torque will be applied to each propeller. Equal speeds of rotation for the propellers are obtainable by changing the pitch of the propellers so that each propeller will absorb the same amount of torque.

I claim:

1. In a counterrotation propeller drive and reduction gear,
   a sun gear, a shaft carrying the sun gear, a series of pinion gears surrounding the sun gear and in mesh therewith, a set of casings for the bearings for the forward set of propellers, an annular member surrounding the shaft and supporting the pinions, and axially spaced therefrom, also supporting the set of casings for the bearings for the forward set of propellers forwardly of the pinions, a ring gear surrounding and in mesh with the pinions, a set of casings for the bearings for the rearward propellers, a second annular member supporting the ring gear, and axially spaced from the ring gear, also supporting the set of casings for the bearings for the rearward set of propellers, a support structure rearwardly of both sets of casings and having spaced bearings therein in which the second annular member is journalled, and spaced bearings within said second annular member for supporting the first annular member, one of said spaced bearings and the ring gear being located axially between the sets of casings.

2. A device as in claim 1 in which the second annular member carries a bearing for the sun gear shaft within the support structure.

3. A device as in claim 1 in which one of the bearings for the second annular member is a thrust bearing and one of the bearings for the first annular members is also a thrust bearing.

4. In a combined reduction gear and counterrotation drive for a counterrotation propeller, a reduction gear including a sun gear, a row of pinion gears meshing with the sun gear and a ring gear surrounding and meshing with the pinion gears, a drive shaft supporting the sun gear, a first annular member including the cage supporting the pinion gears and a second annular member surrounding the first annular member and supporting the ring gear, a row of casings carried by the first annular member forwardly of the pinion gears for supporting the forward row of propeller blades, a second row of casings carried by the second annular member rearwardly of the pinions for supporting the rearward row of propeller blades, a support structure rearwardly of the second row of casings and having spaced bearings therein supporting the second annular member, one bearing being a thrust bearing, and other bearings carried by the second annular member in spaced relation to each other and on opposite sides of the pinions for supporting the first annular member therein, said forward and rearward rows of casings for the propeller blades being located on opposite sides axially of the reduction gear.

5. A device as in claim 4 including a bearing carried by the second annular member between the support bearings for supporting the drive shaft.

6. A device as in claim 4 in which one of said other bearings is a thrust bearing.

* * * * *